Figure 1:
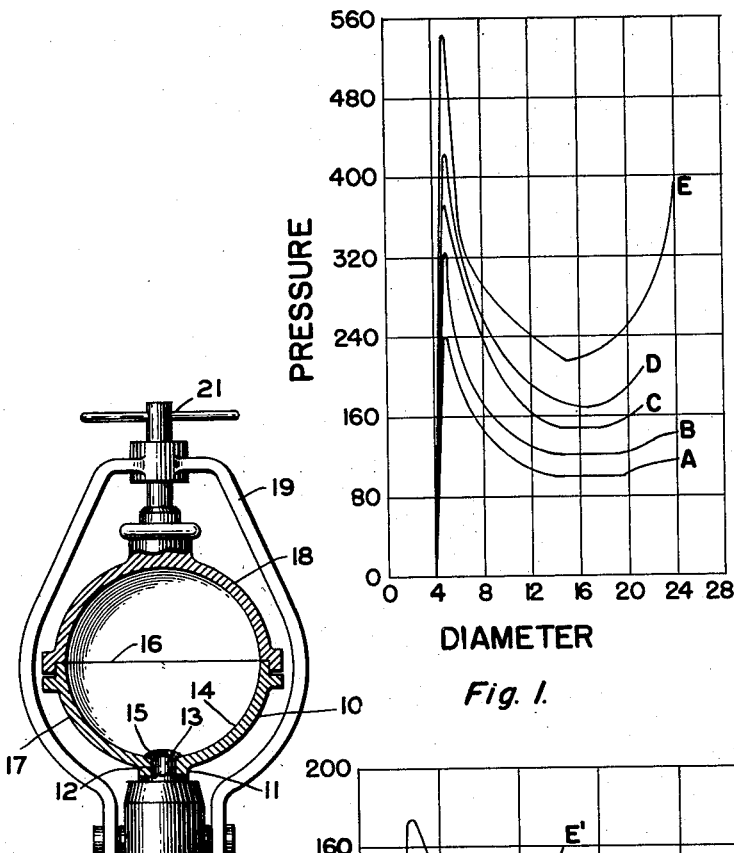

Jan. 28, 1941. W. C. ROSS ET AL 2,230,192

RUBBER ARTICLE AND METHOD OF FORMING THE SAME

Filed Dec. 2, 1938

Inventors
William Campbell Ross
Arnolf P. Rehbock

By Theodore C. Browne
Attorney.

Patented Jan. 28, 1941

2,230,192

UNITED STATES PATENT OFFICE 2,230,192

RUBBER ARTICLE AND METHOD OF FORMING THE SAME

William Campbell Ross, Winchester, and Arnolf P. Rehbock, Cambridge, Mass., assignors to Dewey and Almy Chemical Company, North Cambridge, Mass., a corporation of Massachusetts Application December 2, 1938, Serial No. 243,586

9 Claims. (Cl. 18—58)

This invention relates to the manufacture of rubber articles and particularly to the manufacture of meteorological balloons, both of the pilot and of the sounding types.

Pilot balloons are usually released to measure the wind velocity and are followed from the ground through observation instruments.

Sounding types are somewhat larger and carry recording equipment such as light radio meteorographs.

To get the necessary rate of rise for a pilot balloon, or the necessary "free lift" for the sounding balloon, sea level inflated diameters of 26" and 48–60" respectively have been customary. The manufacture of such balloons by conventional methods has been both difficult and expensive. Dipping forms, if the dipped technique is to be used, have to be relatively enormous and the number required for quantity production makes the initial investment very high. Also it is well nigh impossible to maintain a latex coat on such a huge surface without some slipping of the coating with the consequent formation of sags and thin spots in the balloon envelope. In addition, the necessity of stripping the balloons from the form makes it necessary to have a neck of very material size which is difficult to stopper in a gas tight manner, for, since this type of balloon does not release gas as it enters higher and higher atmospheric levels, but, on the contrary, depends upon upon the expansion of the rubber envelope to secure an approximate equalization of the interior and exterior pressure, a small, but positive pressure is always exerted by the hydrogen in the balloon.

It is an object of this invention to produce rubber articles of very high extensibility; to provide a casting or molding process by which rubber articles may be formed which have an accurate, pre-determined final shape, and uniform wall thickness; and, more specifically, this invention has for its object to produce balloons which have high extensibility and which are, therefore, capable of extraordinary expansion before rupture; which have an even wall thickness, which are light in weight, and which are truly spherical; and to produce such balloons by casting latex in relatively small molds. These and other objects will become clear from the specification and from the drawing, in which the extensibility characteristics of our improved balloons are graphically represented.

A process for manufacturing rubber balls by casting latex has been described by Walter Kay in United States Patent No. 1,998,897. The Kay process, briefly, consists of introducing latex containing a dormant coagulant into a hollow spherical mold, rotating the mold about two axes, gelling the mass, inflating the gel and then vulcanizing.

In practice, the mold is heated at a temperature of 80°–90° C. for such a time as will produce a stiff gel which is easily handled. The gel is washed for several hours, during which time synaeresis takes place, accompanied by further stiffening of the gel.

When balloons are made in this manner, their application to high altitude meteorological work is strictly limited, since the rubber walls of the balloons are heavy and tough, and have an extremely low extensibility. For example, a balloon weighing 100 grams can be expanded only to 3 feet before bursting, and consequently will be expected to break at an altitude of 25,000 feet.

We have discovered that by controlling certain variables in the Kay process, materially softer gels may be formed, which are capable of plastic flow in the wet gel state, as will be demonstrated below, and which for this reason are capable of much greater expansion before rupture than the comparatively tough gels hitherto produced. We have discovered a further totally unexpected and unpredictable fact, namely that finished vulcanized balloons made from such soft gels, themselves have a remarkably high extensibility. For example, a vulcanized balloon produced according to this invention and weighing 100 grams will expand to a diameter of 8 feet before bursting, and therefore is able to reach an altitude of 90,000 feet.

The softness of the gel which can be formed according to our improved process is a function of the interplay of several variables in the Kay process, for example, mass concentration of coagulant, temperature and length of time of gelation, and other possible variable factors in the formation and handling of the gel.

For example, gel stiffness varies directly with the time of gelation. The shorter the gelation time, the softer and more extensible the gel will be. While it has been customary to heat a mix for 15 minutes or even longer, until a gel is formed which is stiff enough to be handled quite easily, we prefer to work with the softest gels which can be handled. As a striking example of the effects of varying gelation time, we submit the graphs of Figs. 1 and 2, which show the properties of five balloons which were gelled for varying periods of time.

Fig. 1 shows five curves representing the expansion of the balloons in the wet gel stage. The balloons were identical as to weight and composition, and were subjected to identical handling conditions throughout their manufacture, the only variable being the length of time for which the dispersion was heated. The gelling times were as follows:

|  | Minutes |
|---|---|
| Balloon A | 5 |
| Balloon B | 5.5 |
| Balloon C | 6.5 |
| Balloon D | 7 |
| Balloon E | 10 |

Diameters in inches were plotted against pressure in millimeters of alcohol as the balloons were expanded to the bursting point. The curves of Fig. 1 shows that the softer the gels, the less pressure was required for inflation to a given volume. Furthermore, the flat portions of curves A, B, C, and D represent a period in which the gels actually increased in diameter with no rise in pressure, a phenomenon which we have defined as "plastic flow." Curve E represents a gel which has been hardened to just such an extent that it is no longer capable of "plastic flow" but which, nevertheless, expands over a considerable range with a small rise of pressure.

If a plot were made for a typical prior art balloon, the curve would be found to have an entirely different character. After the first sharp rise and fall which are shown by the curves of Fig. 1, the pressure would again immediately begin to increase so rapidly that a sharp V-shaped curve would be the result. Consequently, a pressure large enough to burst the balloon would be reached before any significant volume had been attained.

Although we are not aware that a gel as soft as that represented by curve E has ever been produced before, we have arbitrarily selected curve E as defining the boundary between our invention and the prior art, for at this point the gel exhibits a new property—plastic flow. We are concerned, therefore, only with balloons which, in the wet gel state, exhibit the phenomenon of plastic flow, i. e. at some time during inflation expand in diameter without increase in pressure.

Figure 2:
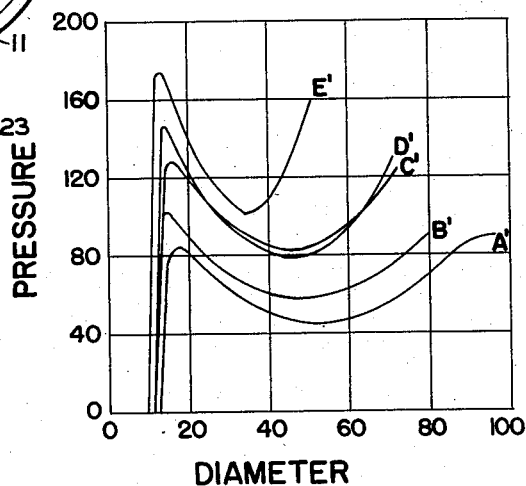

Another series of gels were formed in the same manner, inflated to a standard diameter, dried and then vulcanized. The curves shown in Fig. 2 represent the inflation of these balloons.

The properties of the finished vulcanized balloons also vary with the length of time for which the gels have been heated. Balloons A' and B' require less pressure to initiate expansion, and continue to expand with a lower pressure gradient than balloons C', D', or E'. Finally, the extensibility of balloons A' and B' is so much increased that they are able to reach a significantly larger volume, and consequently a much greater height before bursting.

The following theoretical discussion is set forth in an attempt to clarify the facts which we have observed, but we do not claim that it is the true explanation of these facts, nor do we wish in any way to be limited by it.

According to present-day theory, the coagulation of latex begins with a stage in which the rubber particles draw together forming occasional independent, loose agglomerates. In this condition, the water is still the continuous phase. In subsequent stages of coagulation, the particles approach each other much more closely, finally uniting in a definite tri-dimensional rigid gel structure, in which cohesive forces between the rubber particles are tremendous.

The development of stiffness in a rubber gel, which is brought about, for example, by increasing the length of time of gelation, seems to be an external manifestation of the development of increasing cohesion between the individual rubber particles inside the gel. In the case of gel A, molecular cohesion is very small, with the result that after the initial pressure required for expansion is reached, further stretching of the gel is possible with little or no increase of pressure. As molecular cohesion is allowed to develop, two results make themselves apparent in the pressure-diameter curves. In the first place, a higher initial pressure is required to start expansion. Furthermore, as the intermolecular bonds are stretched, an opposing force is set up, which tends to return the gel to its original shape, and consequently increasingly greater pressure must be exerted in order to cause any further expansion.

A soft gel made according to our invention can be defined as a plastic system since its form is permanently altered when the stress applied to it exceeds a certain value. A stiff gel, on the other hand, behaves as an elastic system, which sets up an opposing internal pressure tending to return the system to its original form if the applied pressure is removed.

We believe that the essential feature of our invention consists in stopping the process of coagulation while the water is still the continuous phase and before material cohesive forces between the rubber particles have developed. In this stage the gel is capable of plastic flow. As the gel stretches, the rubber particles are free to slide one over the other on their water matrices, but when the thinning of the expanding balloon of gel pulls the particles so closely together that the water films break, cohesion begins and the strain spreads from rubber particle to rubber particle. In this condition, the gel behaves as an elastic system.

But, whatever the true explanation, the fact remains that articles produced according to our invention do exhibit the phenomenon of plastic flow in the wet gel state. As a result, they are highly extensible and may be inflated to a considerable volume with a minimum of tension on the rubber aggregates. The final pressure carried in the balloon in the gel stage is low as compared with the stiffer gel, thereby causing the film to dry with less stress on the rubber aggregates composing it. Furthermore, the rubber particles in an expanding soft gel envelope tend to distribute themselves evenly, with the result that a spherical balloon of uniform wall thickness is produced.

The most probable explanation for the development of substantially true sphericity and uniform wall thickness which results from this process appears to be as follows:

The thin portions of gel, upon expansion pass completely through the plastic stage and in to the elastic stage where some strain may be transmitted from rubber aggregate to rubber aggregate. This transmits a strain sufficient to start plastic flow in the thicker and still plastic areas and this process continues with a thinning down of the plastic portions until the strain is equalized. In other words—any strain in the thin, elastic portions steals aggregates from plastic sectors and feeds the newly developing surface with these aggregates so long as any asymmetry of strain exists.

The finished vulcanized balloons in some way preserve the unique properties of our plastic gels. They are not plastic in themselves, for rubber which has undergone vulcanization loses its plasticity and becomes elastic and resilient. Nevertheles, balloons made according to our process do show remarkable extensibility and require very low pressures for expansion. We submit the following possible explanation of this, although here again we do not wish to be limited by any theory set forth.

In our soft gels, the initial inflation in the wet gel stage is effected without causing any strain on the rubber particles themselves, since molecular cohesion is slight or non-existent, while in a stiff gel the rubber particles are strained and stretched as inflation proceeds. Of balloons made from the two gels, the one made from the former will have the greater extensibility. Our explanation of this fact is that the rubber particles, of which it is composed are still at the point of zero stretch, while the rubber of the latter balloon has already been somewhat stretched before vulcanization. But, whatever the true explanation may be, we have observed that, when all other factors remain constant, the final extensibility of each balloon varies inversely with the stiffness of the gel from which it is made.

For convenience in measurement, we have defined extensibility as the ratio between the surface area in square feet and the net weight in grams (total weight minus neck portion) of an inflated vulcanized balloon. Balloon A' for example has a net weight of 97.5 grams, an expanded area of 201 square feet and an extensibility ratio (area/weight) of 2.06. Balloon E' has an expanded area of 56.9 square feet, and an extensibility of 0.58.

Figure 3:
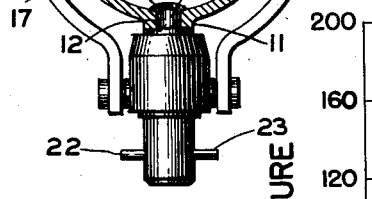

In making a balloon in accordance with our invention, a machine is used of the general type described in the above-mentioned Kay patent. Figure 3 of the accompanying drawing illustrates a hollow spherical mold which may be used in conjunction with such a machine. The mold has a neck or stem portion provided with a bore 12 and a core pin 13. The spherical interior surface 14 is depressed at 15 in the vicinity of the bore 12 to form a concentric spherical surface of a slightly greater diameter. By virtue of this construction a somewhat thicker rubber collar is built up in the area 15, surrounding the neck, where the greatest stress is exerted on the finished balloon. The mold is split at its equator 16 and the two halves 17 and 18 are held together by a bail 19 and a clamping screw 21. The pins 22 and 23 are adapted to fit into a bayonet latch upon an apparatus of the type described in the Kay patent, thereby permitting the mold to rotate simultaneously about two axes. The mold diameter is determined by the size of the balloon desired. For example, the mold diameter may be four inches when it is desired to make a balloon which will have a bursting diameter of eight feet.

The neck portion is first formed by pouring just enough compounded latex dispersion into the mold portion 17 to fill the bore 12 and cover the zone 15. The latex contains a setting agent, for example, a 10% solution of an agent such as calcium formate or ammonium nitrate, which is added in amounts varying from 4% to 6%, figured on the total wet weight of the mix. For forming the body or wall of the balloon there is introduced into the mold about 97.5 grams (dry basis) of the compounded latex. The mold is then assembled and locked in the bayonet latch of the apparatus and rotated about two axes in water at 71° C. for approximately five minutes. The mold is then chilled to about 11° C., opened, and a spherical ball of soft latex gel containing all the water initially in the latex is removed. Compressed air is immediately blown in through the stem or neck portion of the hollow ball and the gel expanded to about 22 inches. The thin-walled, expanded gel is now allowed to dry several hours. The dried gel is talced inside and out, collapsed and given a light cure by vulcanizing in a hot air vulcanizer. This balloon weighs about 100 grams and is capable of expanding to a diameter of eight feet before rupture.

Although we prefer to control the softness of our gels by regulating the time of gelation, as we have described above, we have discovered by experiment many other ways in which the same result may be obtained. If the amount of gelling agent be increased, for example, the temperature of gelation must then be lowered until the resulting gel has the desired consistency. Or, if, for any reason, it is desired to prolong the gelling time over that shown in the example, a corresponding drop in the gelation temperature will give the desired soft gel. Obviously, therefore, there are several combinations of variables all of which will produce the plastic gels of our invention. Furthermore, while our invention has been described herein as practiced in the manufacture of hollow articles such as balloons, it is equally applicable to the manufacture of other articles which are subsequently deformed into their final shape.

We claim:

1. The process of making an article which includes making a suitable mixture of an aqueous dispersion of rubber and a gelling agent, forming therefrom a plastic gel and giving a final shape to the article by subjecting the wet gel to plastic flow.

2. The process of making an article which includes making a suitable mixture of an aqueous dispersion of rubber, a vulcanizing agent and a gelling agent, forming a gel therefrom capable of plastic flow in the wet gel state, causing the article to assume its final shape by subjecting the wet gel to plastic flow, removing the water from the gel, and vulcanizing the article.

3. The process of making a balloon which includes making a suitable mixture of an aqueous dispersion of rubber, a vulcanizing agent and a gelling agent, forming therefrom a hollow mass of gel capable of plastic flow, inflating the wet gel to cause its plastic flow, and drying and vulcanizing the balloon.

4. The process of making a substantially spherical balloon which includes making a suitable mixture of an aqueous dispersion of rubber, a vulcanizing agent and a gelling agent, introducing the mixture within a mold, forming from said mixture a hollow ball capable of plastic flow in the wet gel state by subjecting the mixture to a suitable temperature for an appropriate time, removing the ball from the mold, inflating the wet gel over substantially the full period of time during which its volume increases without significant increase in pressure whereby a substantially uniform wall thickness is imparted to the ball and a substantially spherical shape is assumed, and drying and vulcanizing the balloon so formed.

5. The process of making an article which includes making a gel capable of plastic flow from a mixture of an aqueous dispersion of rubber and a gelling agent, by subjecting the dispersion for an appropriate time to an appropriate temperature and then imparting a final shape to the article by subjecting the gel to plastic flow.

6. A meteorological balloon comprising a hollow spherical envelope of uniform wall thickness and formed of a vulcanized rubber material having an extensibility ratio greater than 0.58 whereby the balloon is capable of rising to high altitudes.

7. A rubber balloon according to claim 6 having an integrally molded reinforcing collar of rubber surrounding the neck of the balloon.

8. In the process of forming articles from aqueous dispersions of rubber, the improvement which consists of plastically flowing a plastic gel formed from a mixture of said dispersion with a gelling agent into the configuration desired.

9. A hollow rubber article formed of a vulcanized rubber material having an extensibility ratio greater than 0.58.

WILLIAM CAMPBELL ROSS.
ARNOLF P. REHBOCK.